Oct. 7, 1958  F. MEYER, JR  2,854,943
MULTIPLE INDICATOR ASSEMBLY
Filed April 12, 1955   3 Sheets-Sheet 1
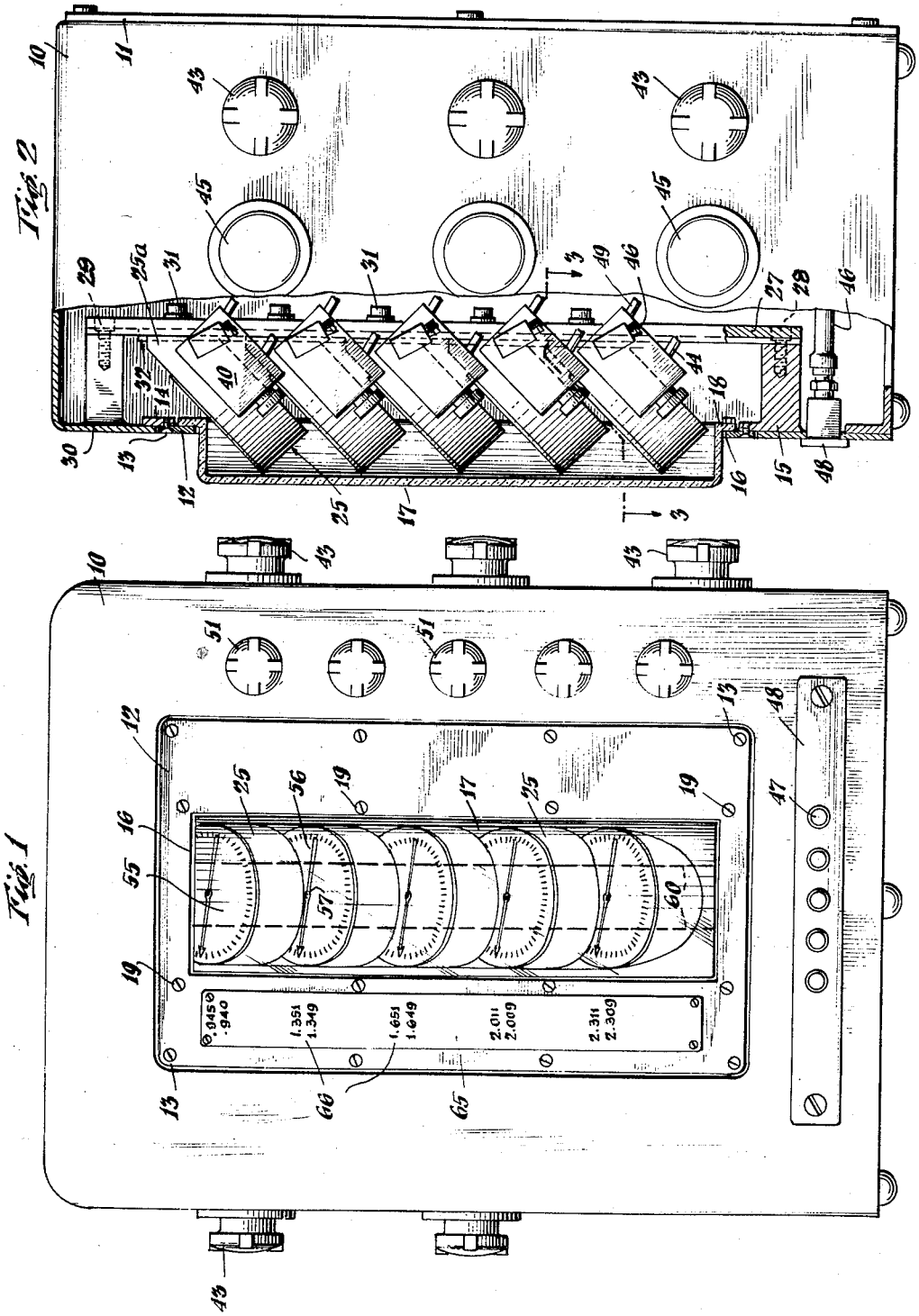

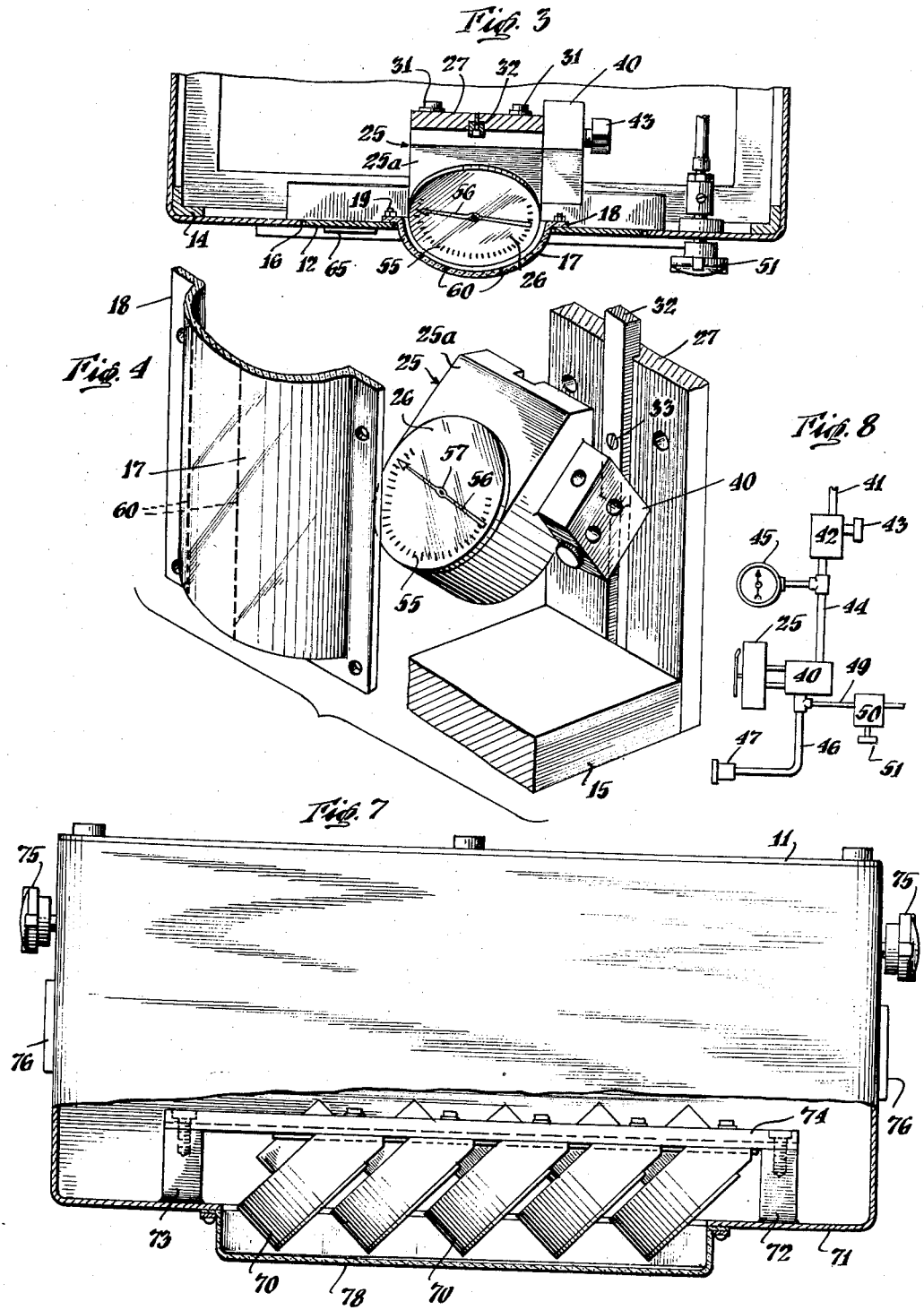

Oct. 7, 1958 F. MEYER, JR 2,854,943
MULTIPLE INDICATOR ASSEMBLY
Filed April 12, 1955 3 Sheets-Sheet 3
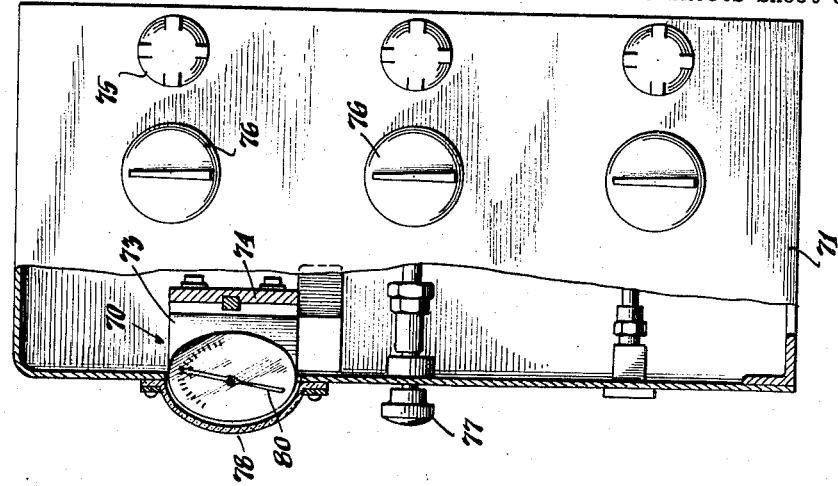
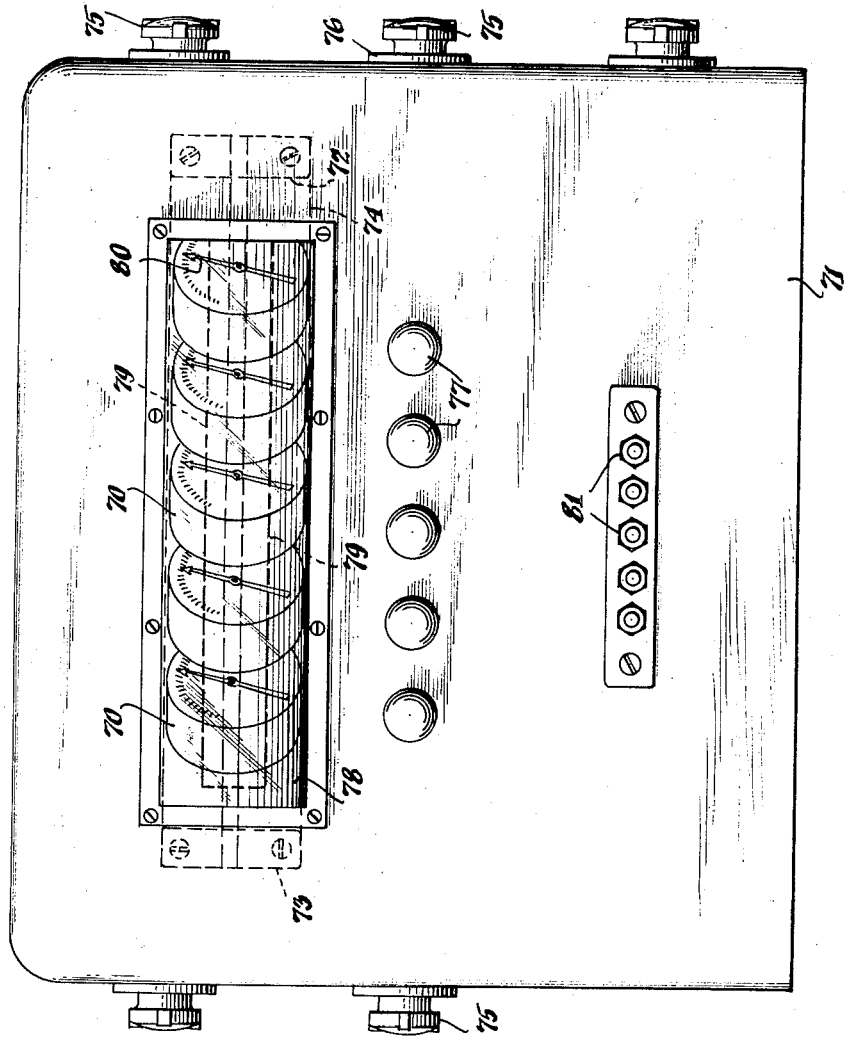

United States Patent Office 2,854,943
Patented Oct. 7, 1958

2,854,943
MULTIPLE INDICATOR ASSEMBLY

Franklin Meyer, Jr., Forestdale, R. I., assignor to The Taft-Pierce Manufacturing Company, Woonsocket, R. I., a corporation of Rhode Island Application April 12, 1955, Serial No. 500,875

11 Claims. (Cl. 116—114)

The invention is concerned with a multiple indicator assembly embodying a plurality of individual indicator units arranged in a particularly convenient and efficient manner.

The inspection and testing of manufactured parts such as elements of a machine commonly involves the measurement of a number of various dimensions and relations of surfaces of a single piece or two or more pieces adapted to be fitted or associated together. In the interest of efficiency and speed arrangements have been made and used for taking such measurements simultaneously. The present invention is concerned with improvements in devices of that type and purpose and is particularly characterized by an assembly and arrangement of indicator units which enable an operator to determine at a single quick glance whether the matters being gaged are within established permissible tolerances. In accordance with the principles of the invention a plurality of indicators, which may be of a standard type, are symmetrically mounted in a single row in a compact angularly overlapping relation whereby the critical indicator parts including a normal tolerance range portion of the graduated dial are clearly exposed to view with other operating parts arranged in overlapped relation in the background. Each indicator is connected to its own gage means and is adapted to register a particular measurement of the common workpiece. By the particular arrangement a number of indicators may be closely assembled in a small area in a common casing and in such a relation that the normal tolerance range on each of the several dials falls within a common zone extending continuously along the exposed dial parts and any departure from the tolerance range is instantly observable.

The basic principles of the invention are particularly useful and practicable as associated and combined with test devices of the air gage type. In such combinations the indicator units are mounted together in the novel manner characterizing the present invention and in such numbers as desired for a particular job. The connections to the air gages are essentially fluid conduits embodying standard and interchangeable parts and air gages which are readily interchangeable and have standard connections.

The invention embodies standardization of parts to a marked degree and makes for economy and convenience of manufacture. For a given workpiece or test set-up the desired number of indicator units dependent upon the measurements to be made are assembled in an appropriate casing and appropriate air gages plugged into the assembly.

The invention accordingly comprises the features of construction, combinations of elements, and arrangement of parts, which will be exemplified in the construction hereinafter set forth, and the scope of the invention will be indicated in the claims.

Reference should be had to the following detailed description taken in connection with the accompanying drawings in which:

Fig. 1 is a front elevation of a device embodying one specific form of the invention with the indicator units arranged in a vertical row;

Fig. 2 is a side elevation looking from the right in Figure 1 with portions of the casing broken away to show better the individual indicator units;

Fig. 3 is a horizontal section taken on subsbtantially the line 3—3 of Figure 2;

Fig. 4 is a fragmentary exploded view of certain parts including particularly one of the indicator units, its mounting means and a section of the front protecting shield;

Fig. 5 is a front elevation of another embodiment of the invention with the indicator units arranged in a horizontal row;

Fig. 6 is a side elevation looking from the right in Figure 5 with portions of the casing broken away;

Fig. 7 is a top plan view of the device of Figure 5 with a portion of the casing broken away; and Fig. 8 is a diagrammatic view of a typical system showing the relation of the fluid conduits and controls to the indicator unit.

Figures 1 to 4 show one representative embodiment of the invention. The device thereof includes a main casing 10 having a removable rear plate 11 and a front frame plate 12 removably secured in place by a series of set screws 13 threaded into suitable frame parts such as the casing part 14 at the top and the bracket 15 at the bottom. The plate 12 has an elongated window opening 16 in which is mounted an outwardly protruding protective shield 17 made of suitable transparent material such as Plexiglas. The shield 17 is provided with a rear flat rectangular flange part 18 as shown particularly in Figures 2 and 4 adapted to be secured against the rear face of the plate 12 as by means of set screws or small bolts 19.

Mounted within the casing behind the window shield 17 are a plurality of individual indicator units arranged in a special angular relation as shown in the drawings. The individual indicator units may vary as to design, precise purpose and connections dependent upon the circumstances in a particular case. The particular unit shown is one made responsive to fluid conditions in a conduit connected to an air gage. The indicator means and the air gage and fluid connections may be generally of the type shown in the Patent No. 2,513,374 of which I am the joint patentee with Clifford Stead. In general the indicator unit includes, as shown in that patent, a diaphragm means responsive to fluid pressures or velocities in a line connected to an air gage having nozzle outlets variable as to effective air escape openings dependent upon the dimensions or relations of the surfaces being measured.

In accordance with the principles of the invention the indicator units 25 may be similar and standardized at least as to their outward shape and appearance, including the dial means 26 and the means for mounting the unit on a support. The mounting means shown particularly in Figures 2, 3 and 4 include an elongated plate 27 secured by set screws 28 and 29 to the lower bracket 15 and an upper bracket 30 respectively within the casing 10. The brackets 15 and 30 may be secured within the casing in any suitable manner as by welding thereto. The individual indicator units 25 are secured in spaced relation along the plate 27 each by a pair of set screws 31 extending through openings in the plate 27 and into threaded holes in a supporting bracket 25a secured to and forming a part of the unit 25. The units are held in correct alignment by a tongue and groove connection which in the specific embodiment includes a longitudinal groove in the plate 27 and similar grooves in the brackets 25a of the respective units 25 and a common rectangular bar 32 adapted to be received in the groove of the plate and the grooves of the units. The bar 32 may be secured to the plate 27 by spaced set screws one of which is shown at 33 in Figure 4.

The device of Figures 1 to 4 shows five indicator units mounted therein but it will be understood that the number may be varied dependent upon the circumstances including particularly the character of the work to be tested. The supporting plate 27 and the front window and shield will have a size appropriate to the number of indicator units desired to be embodied in the assembly. Other associated parts including particularly the fluid connections and the control valves and regulators may also conveniently and economically be substantially standard parts.

As previously stated the type of the indicator unit and the gaging system may vary in accordance with the circumstances and the details thereof are not important to the present invention, but for illustrative purposes it may be assumed that the indicator and system are in general like those of the aforementioned Patent 2,513,374. The fluid connections and elements of such a system are shown in diagrammatic form in Figure 8 hereof and the manner of mounting and location of the respective elements are shown somewhat generally in the Figures 1 to 4.

Each indicator includes a block portion 40 assembled thereto as part of the individual unit into which the fluid conduits extend. Air is applied from a suitable source through a conduit 41 (Fig. 8) to a pressure regulator 42 manually adjustable by the knob 43, the pressure in the line 44 supplied to the block being registered on the pressure gage 45. There will, of course, be one regulator and gage for each of the indicator units and accordingly, as appears particularly in Figure 1, there are five such regulator knobs 43. From the block 40 a fluid line 46 extends to a jack 47 mounted in a plate 48 on the front of the main casing. The jack plate 48 is separately made and will of course contain as many jacks 47 or outlets as are needed for the particular job. Tubes leading to individual air gages (not shown) are plugged into the outlets 47. In Figure 1 there are five such outlets shown on the assumption that each indicator is connected to one line and jack, but in accordance with modified circuits more than one line may be connected to a single indicator for particular types of testing and particular arrangements of the fluid responsive means in the indicator and accordingly the number of outlets 47 may not necessarily be the same as the number of indicator units. It is desirable to provide means for establishing the zero settings of the individual gages or, in other words, to adjust the condition such that the tolerance range of the indicator sweep hand will fall within a certain angle or zone. Accordingly in the device of the present type the line leading to the air gage has a branch 49 provided with a bleed valve 50 operable from a knob 51. The several knobs may conveniently be arranged in a vertical row as shown in Figure 1, the respective knobs 51 being of course associated with the indicator unit 25 immediately to the left of the knob.

Each indicator unit includes a circular disc shaped graduated dial face 55 over which operates a sweep hand or pointer 56 mounted on a pivot pin 57 having an axis perpendicular to the plane of the dial face 55. The individual units are as shown arranged in a symmetrical row with the axes of the pivotal supports for the sweep hands 56 located in a common vertical plane and with the axes and likewise the plane of the dials 55 all at an acute angle to the vertical supporting plate 27 and correspondingly at an acute angle to the front face of the instrument, or to any front vertical plane parallel to the general plane of the indicator unit assembly which is termed herein a common front viewing plane.

The individual units are arranged at the angle described and closely positioned to each other with the rear portions overlapping and accordingly, as appears in Figures 1 and 2, a substantial portion of the rear face of the dial of each of the indicator units below the top one are obscured by the preceding upper unit. The rear portion of the top unit may be permitted to extend behind and be blanked out by a portion of the casing. However, in normal operation the zero setting of the indicator hands from a standard part will be adjusted such that the tolerance range for the movement of the hand 56 will lie within the middle of the exposed portion of the dial. As heretofore described the individual units project outwardly into a window opening and are protected by a common transparent shield 17. The shield preferably is curved in its middle body portion to conform with the forward edges of the circular front portions of the indicator units and their dials 26. Projected onto a horizontal plane the circular shape of the front part of the indicator units and the dials 26 will be substantially elliptical and the shield 17 is correspondingly shaped as may be seen more clearly in Figures 3 and 4. The shield 17 is provided with suitable marking or coloring to define a middle tolerance zone which in the present case comprises the area or angle between the lines 60 inscribed or marked on the shield 17.

Various other refinements and detail features may of course be included. One such feature is shown in Figure 1 comprising a small elongated plate 65 mounted vertically alongside the display window and bearing data 66 at appropriate positions opposite the respective indicators 25, the data 66 comprising in each case the prescribed dimension or tolerance range for the surface being measured by the corresponding gage and indicator.

Different arrangements of the indicator means may be provided, one further form being shown in Figures 5, 6 and 7. In this case the general construction and connections may be generally similar to those of the form of device shown in Figures 1 to 4 except that the indicator units 70 are arranged in a horizontal row instead of a vertical row. For this purpose, as shown in Figure 7, the interior of the casing 71 is provided with a pair of brackets or bosses 72 and 73 to which is secured a plate 74 similar to the plate 27 of Figures 1 to 4, and to which are clamped the indicator units 70 in a similar manner. In the horizontal type of assembly shown in Figures 5 to 7 the regulator knobs 75 for the respective fluid circuits may be located at the opposite side surfaces of the casing as shown in Figures 5 and 6 with adjacent pressure indicator dials 76. The knobs 77 controlling the bleed line to the respective units are shown in Figure 5 as located conveniently in a row below the indicator units 70. The device has a similar transparent shield 78 over the indicator exposure window which may be provided with suitable markings such as the lines 79 to define an intermediate tolerance range for the indicator hands 80. The jacks for connection to the respective air gages may be located in a row as indicated at 81 in Figure 5.

The form of Figures 5, 6 and 7 shows an assembly of five indicators 70, which happens to be the number shown in Figure 1, but it should be understood that in each case the number is intended to comprise only a representative showing of a plurality of indicators and the number may vary from two upwardly to any number corresponding to the number of measurements desired to be made simultaneously for any particular job.

By the angular arrangement illustrated in both embodiments of the invention several indicator units are overlapped and compacted into a relatively short row but with the important or critical part of the dial and range of movement of the hand remaining fully exposed to view. In other words after the individual test systems have each been properly adjusted, if the measurements are within the permissible tolerance range, each band will occupy a position in the zone between the lines 60 in Figure 1 or lines 79 in Figure 5. The positions of the indicator hands may be readily seen from a point directly in front of the instrument or from a point somewhat to one side in the case of the instrument of Figure 5 or from above in the case of the instrument of Figure 1. The latter may provide a particular advantage where the instrument is on a support of normal table or bench height before which the operator is standing.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. An indicator assembly embodying a main casing having a front face with an indicator display window, a plurality of individual indicator units mounted in said casing each indicator unit being of a type having a movable indicator member rotatable in a flat plane on an axis perpendicular thereto, the indicator units being arranged in a row at said window in an angular overlapping relation with respect to said front face with the axis and plane of movement of each indicator member at an acute angle to the plane of said front face and starting from one end of the row the rear portion of successive indicator units being behind the preceding unit in the row.

2. In a multiple air gage assembly, a main casing, a plurality of individual indicator units mounted in said casing, a fluid conduit means for each of said units for supplying fluid to an air gage, fluid connections from each of the fluid conduit means to its respective indicator unit, each unit being of a type responsive to fluid flow in the conduit means and having a movable indicator member rotatable in a flat plane on an axis perpendicular thereto, the indicator units being arranged in a row in an angular overlapping relation with respect to a common front viewing plane with the axis and plane of movement of each indicator member at an acute angle to said common viewing plane.

3. An indicator assembly embodying a plurality of individual indicator units mounted in a common casing each unit being of a type having a movable indicator member rotatable in a flat plane on an axis perpendicular thereto, the indicator units being arranged closely adjacent in angular positions in a row with the rear portions overlapping whereby rear portions of the plane of movement of the indicator members of intermediate units are obscured but front portions including a normal tolerance range are plainly visible.

4. An indicator assembly embodying a plurality of individual indicator units mounted in a common casing each unit being of a type having a sweep hand rotatable over a flat dial on an axis perpendicular to said dial the indicator units being arranged in a symmetrical row with the axes of the sweep hands parallel and the plane of each dial at an acute angle to a common front viewing plane, the units being closely adjacent and overlapping in a manner such that starting from one end of the row the rear portion of successive dials is behind the preceding indicator unit leaving a front portion exposed to view.

5. An indicator assembly embodying a plurality of individual indicator units mounted in a common casing, each unit being of a type having a sweep hand rotatable over a flat dial on an axis perpendicular to said dial the indicator units being arranged in a symmetrical row with the axes of the sweep hands parallel and the plane of each dial at an acute angle to a common front viewing plane, the units being closely adjacent and overlapping in a manner such that starting from one end of the row the rear portion of successive dials is behind the preceding indicator unit leaving a front portion exposed to view, and a common transparent shield mounted over the front with markings defining a mid zone extending over the front of each indicator adapted to provide a tolerance range for each unit.

6. An indicator assembly embodying a plurality of individual indicator units mounted in a common casing each unit being of a type having a sweep hand rotatable over a flat dial on an axis perpendicular to said dial the indicator units being arranged in a symmetrical row with the axes of the sweep hands parallel and the plane of each dial at an acute angle to a common front viewing plane, the units being closely adjacent and overlapping in a manner such that starting from one end of the row the rear portion of successive dials is behind the preceding indicator unit leaving a front portion exposed to view, each unit presenting a curved front edge, and a common transparent shield mounted over the front with a curved portion common to and adapted to fit over the front portion of each of the units.

7. An indicator assembly embodying a plurality of individual indicator units mounted in a common casing, each unit being of a type having a sweep hand movable over a flat dial on an axis perpendicular to the dial, the indicator units being arranged closely adjacent in angular positions in a symmetrical row with the rear portions of the units overlapping and the front portion of each dial plainly visible, each unit presenting a curved front edge, and a common transparent shield mounted over the front with a curved portion common to and adapted to fit over and conform to the said curved front edge of each of the units.

8. An indicator assembly comprising a plurality of similar indicator units of a type having a sweep hand movable over a flat dial, a common supporting member for the units, each unit having a rear supporting bracket, means for securing the units to said member in a single symmetrical row the units being arranged in an overlapping relation with the plane of each dial and the axis of each unit at an acute angle to the direction of said row.

9. A multiple air gage assembly comprising a main casing a plurality of indicator units of a type responsive to fluid flow in an air gage fluid supply line and each having a sweep hand movable over a flat dial, a common elongated supporting member for the units mounted in said casing, means for individually and independently securing the units to said member in a row the units being arranged in an overlapping relation with the plane of each dial and the axis of each unit at an acute angle to the direction of the row, fluid conduit means in said casing for each of said units for supplying fluid to an air gage, and fluid connections from each of the fluid conduit means to its respective indicator unit.

10. An indicator assembly comprising a plurality of similar indicator units of a type having a sweep hand movable over a flat dial, a common supporting plate for the units, means for securing the units to said plate in a single longitudinally extending row, the units being arranged in an overlapping angular relation with respect to said plate with the plane of the dials at an acute angle to said plate and with the rear portions of intermediate dials obscured from view but with the front portions of all dials plainly visible.

11. An indicator assembly comprising a plurality of similar individual indicator units each being of a generally flat type with a sweep hand rotatable over a flat dial on an axis perpendicular to the dial, a common supporting plate for the units, means for securing the units to said plate in a single longitudinally extending row said means including a bracket for each unit and a tongue groove connection to said plate extending longitudinally thereof, said units being arranged in an overlapping angular relation with the axes of the sweep hands in a common plane and said axes and the planes of the respective dials at an acute angle to the direction of the row and said plate, the rear portions of intermediate dials being largely obscured from view but with the front portions of all dials plainly visible from the front.

References Cited in the file of this patent

UNITED STATES PATENTS

| | | |
|---|---|---|
| 398,713 | Enos | Feb. 26, 1889 |
| 529,433 | Vleck | Nov. 20, 1894 |
| 1,898,760 | Clokey | Feb. 21, 1933 |
| 2,153,595 | Scantlebury | Apr. 11, 1939 |
| 2,513,374 | Stead | July 4, 1950 |